(12) United States Patent
Kelly

(10) Patent No.: US 8,342,786 B2
(45) Date of Patent: Jan. 1, 2013

(54) CONTAINER AUTO-LOCK SYSTEM

(75) Inventor: Thomas P. Kelly, Colleyville, TX (US)

(73) Assignee: BNSF Railway Company, Fort Worth, TX (US)

(*) Notice: Subject to any disclaimer, the term of this patent is extended or adjusted under 35 U.S.C. 154(b) by 178 days.

(21) Appl. No.: 12/906,620

(22) Filed: Oct. 18, 2010

(65) Prior Publication Data
US 2012/0093626 A1 Apr. 19, 2012

(51) Int. Cl.
B60P 7/08 (2006.01)
(52) U.S. Cl. ............................................. 410/84; 410/70
(58) Field of Classification Search ............... 410/69, 410/70, 84, 73, 76, 80; 292/121; 24/287; 248/503
See application file for complete search history.

(56) References Cited

U.S. PATENT DOCUMENTS

| | | | |
|---|---|---|---|
| 6,077,006 A * | 6/2000 | Nelson | 410/82 |
| 6,490,766 B1 | 12/2002 | Tiemann | |
| 6,546,878 B1 | 4/2003 | Smith et al. | |
| 7,056,081 B2 | 6/2006 | Kelly | |

OTHER PUBLICATIONS

Non-Final Office Action from counterpart U.S. Appl. No. 13/281,137 dated Jan. 18, 2012.
Amendment from counterpart U.S. Appl. No. 13/281,137 dated Jan. 25, 2012.

* cited by examiner

Primary Examiner — Stephen Gordon
(74) Attorney, Agent, or Firm — James E. Walton; Richard G. Eldredge

(57) ABSTRACT

A container according the present application includes a container auto-lock system. The container auto-lock system is integrated into the outboard apertures of the lower castings of a domestic sized container. The container auto-lock system includes a locking mechanism which is configured to recess when the container is lowered onto a surface lacking an acceptable receiving aperture. The locking mechanism is also configured to automatically lock when placed on top of a domestic sized container. The container auto-lock system is configured to be compatible with international sized container by allowing the inboard apertures on each lower casting to be available for attaching the domestic container on top of an international container with a conventional locking device.

9 Claims, 6 Drawing Sheets

CONTAINER AUTO-LOCK SYSTEM

BACKGROUND

1. Field of the Invention

The system of the present application relates to a freight container auto-lock system and method for operating the system.

2. Description of Related Art

Freight containers are commonly used for transporting cargo by ship and rail. Typically freight containers are rectangular and exist in various sizes. A typical freight container has corner castings, or castings near the corners. The castings have one or more apertures which are configured for coupling together adjacent containers. Many freight operators use inter-box connecters ("IBC's") to attach stacked freight connectors together. IBC's are non-integral with the containers themselves. Furthermore, the IBC's are manually operated to connect the stacked containers via the corner castings. It is desirable for a freight operator to unload freight containers from a rail as expeditious as possible.

Referring to FIG. 1, an IBC 101 is illustrated in conjunction with a lower container 103 and an upper container 107, Four IBC's 101 attach lower container 103 to upper container 107 via a casting 105 and 109 in each mating corner of containers 103 and 107. During a typical unloading procedure, a person must manually unlock each IBC 101 so that upper container 107 can be vertically removed via a hoist, crane, or the like. Next, a person removes and stows each IBC 101 so that lower container 103 can then be removed. Loading and attaching of lower container 103 and upper container 107 is generally the reverse process associated with the above unloading procedure. The manual locking/unlocking and stowing of each IBC 101 requires substantial time and effort. Furthermore, each IBC 101 is of a thickness that produces a gap 111 between lower and upper containers 103 and 107. Typically gap 111 is approximately between 1-2 inches; however, gap 111 represents valuable space.

Although great strides have been made in the field of securing freight containers, considerable shortcomings remain.

DESCRIPTION OF THE DRAWINGS

The novel features believed characteristic of the system are set forth in the description. However, the system itself, as well as, a preferred mode of use, and further objectives and advantages thereof, will best be understood by reference to the following detailed description when read in conjunction with the accompanying drawings, wherein.

Figure 1:
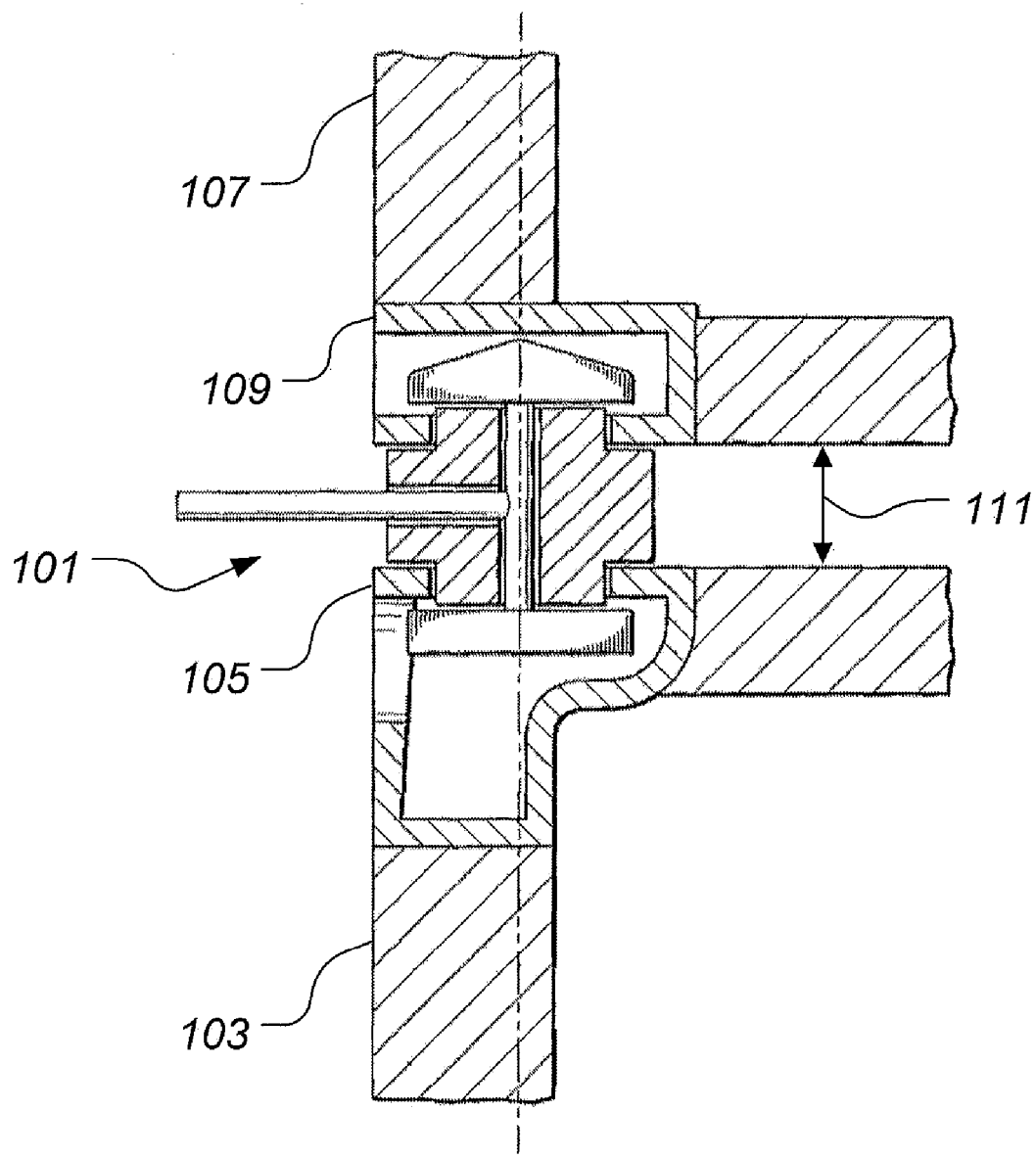
FIG. 1 is a partial cross-sectional view of a conventional inter-box connector.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the system as described herein.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
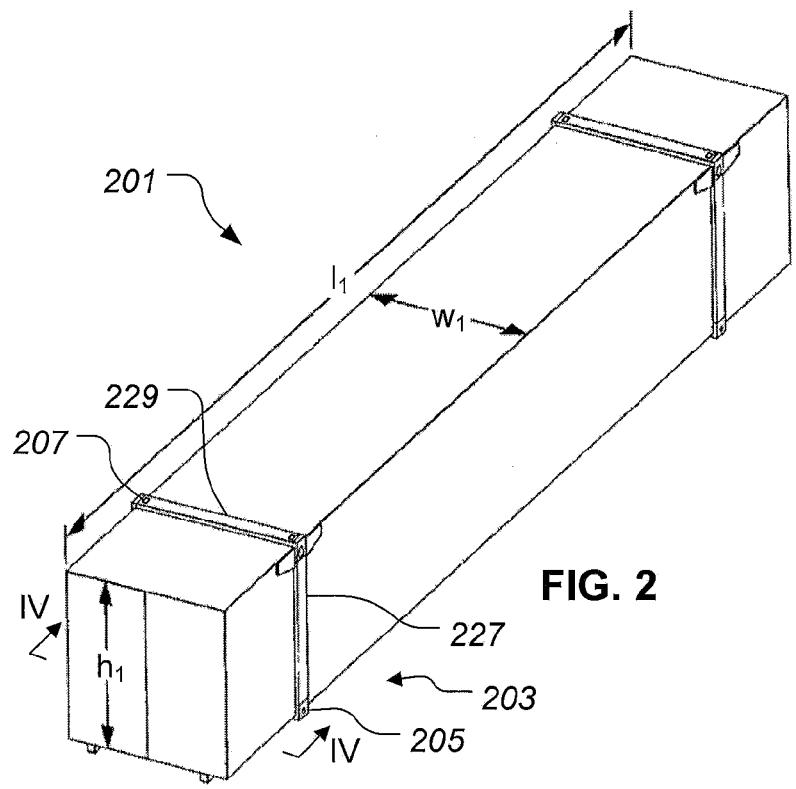
FIG. 2 is a perspective view of a container having a container auto-lock system according the preferred embodiment of the present application.

Referring to FIG. 2, a container 201 having a container auto-lock system ("CALS") 203 according to the present application is illustrated. Container 201 is a VVTP (wide-to-pick) domestic sized container typically having a length $l_1$ of 53' and a width $w_1$ of 102". Container 201 typically has a height $h_1$ of 102", but the height dimension is not critical and could be of any practical height. Container 201 has an upper casting 207 and a lower casting 205. Container 201 also includes side posts 2 227 and headers 229, which provide structural loads paths between upper castings 207 and lower castings 205. CALS 203 is preferably integrated into each lower casting 205 on container 201. An alternative embodiment of CALS 203 may be integrated into other areas of container 201, such as on the top or even side of container 201. CALS 203 is configured to be compatible with freight containers of a variety of sizes, as described further herein.

Figure 3:
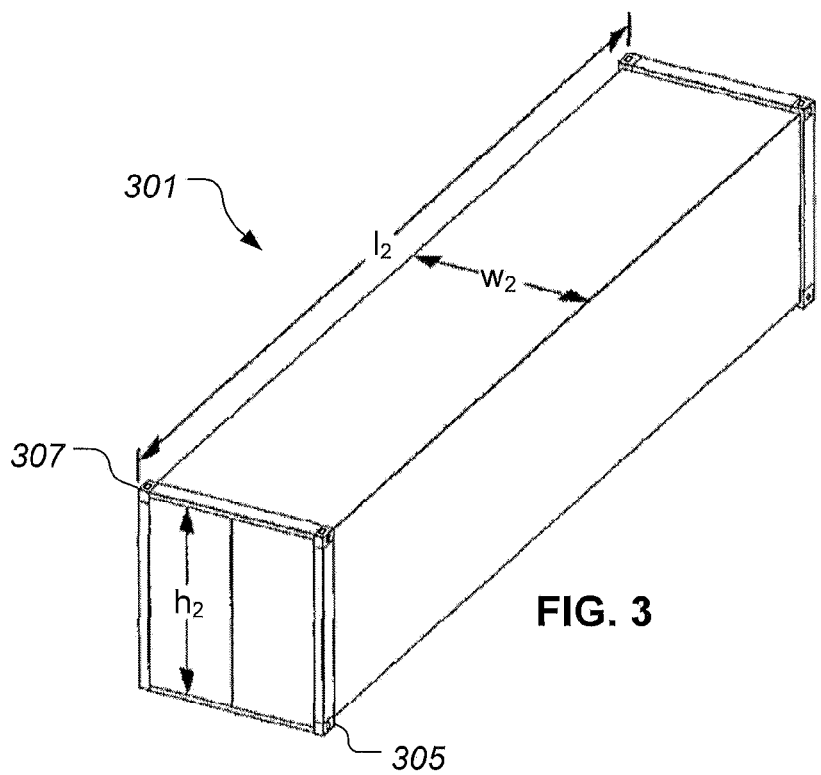
FIG. 3 is a perspective view of a international type container.

Referring also to FIG. 3, a container 301 is illustrated. Container 301 is an international type container typically having a length l2 of 40' and a width w2 of 96". Container 301 typically has a height $h_2$ of 102", but the height dimension is not critical and could be of any practical height. Container 301 has a lower casting 305 and an upper casting 307.

Containers 201 and 301, as well as other sized containers, are typically stacked during transport and storage. Lifting mechanisms typically use hydraulically actuated arms and lift attachments to spread to the appropriate width and attach to the container through the upper castings. Containers 201 and 301 can be transported via a variety of means, such as by train and trailer.

Figure 4:
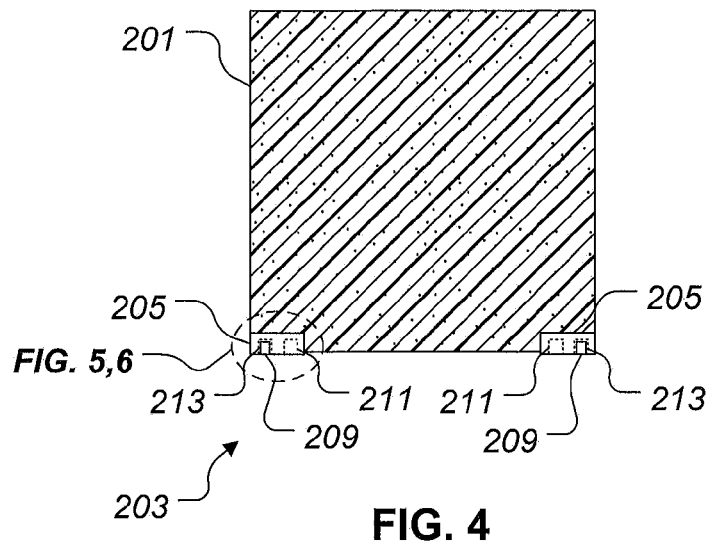
FIG. 4 is a stylized partial cross-sectional view of the container of FIG. 2, according the preferred embodiment of the present application.
Figure 5:
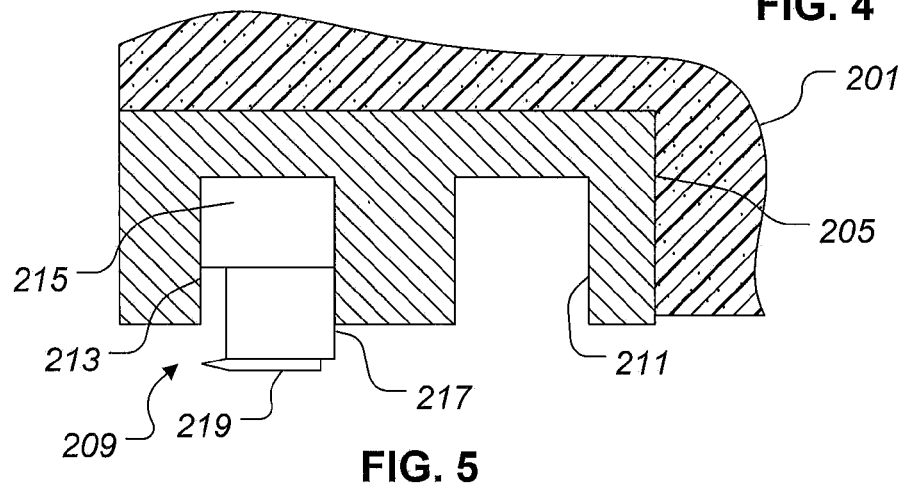
FIG. 5 is a stylized partial cross-sectional view of the container of FIG. 2, according the preferred embodiment of the present application.
Figure 6:
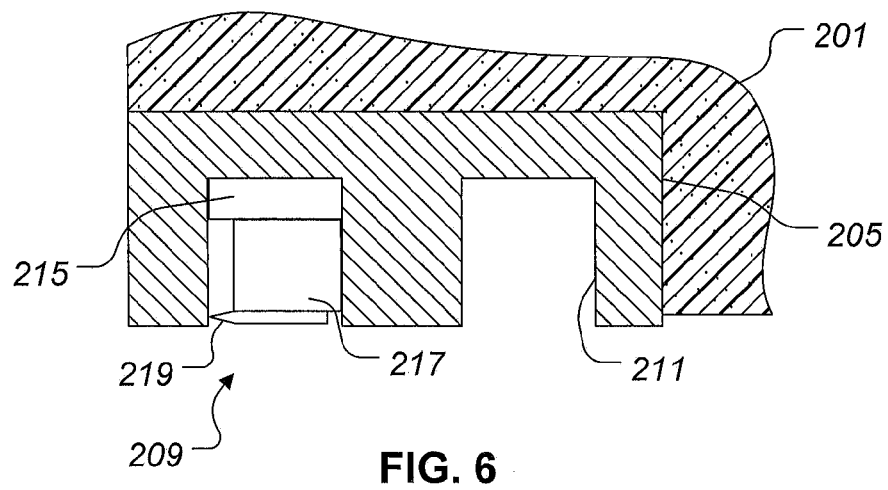
FIG. 6 is a stylized partial cross-sectional view of the container of FIG. 2, according the preferred embodiment of the present application.

FIGS. 4-6 are schematic cross-sectional views through container 201 in order to illustrate CALS 203 in further detail. CALS 203 is configured for automatically securely locking container 201 when container 201 is: 1) stacked on top of another domestic container 201, 2) stacked on top of a railcar having a receiving aperture, 3) stacked on top of a trailer having a receiving aperture, and 4) locking container 201 to any device having receiving apertures for CALS 203. Similarly, CALS 203 is configured for automatically unlocking container 201 when container 201 is lifted off from on top of: 1) another container 201, 2) a railcar having a receiving aperture, 3) a trailer having a receiving aperture, and 4) any device having receiving apertures for CALS 203. Furthermore, CALS 203 is configured to be compatible with non-domestic containers, such as international container 301, and other platform surfaces. Locking mechanism 209 is configured to automatically retract and recess when container 201 is placed upon a platform surface that does not have an aperture configured to receive locking mechanism 209. This compatibility feature of CALS 203 allows container 201 to be stored and transported in a wide variety of scenarios.

Figure 8:
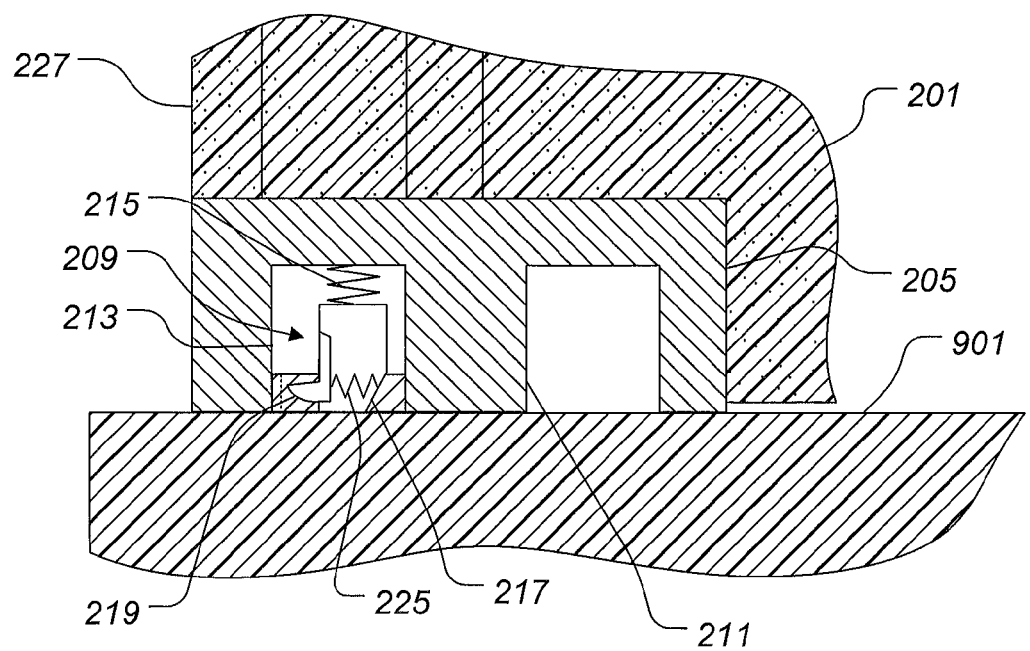
FIG. 8 is a stylized partial cross-sectional view of the container of FIG. 2 shown stacked onto a platform surface.
Figure 10:
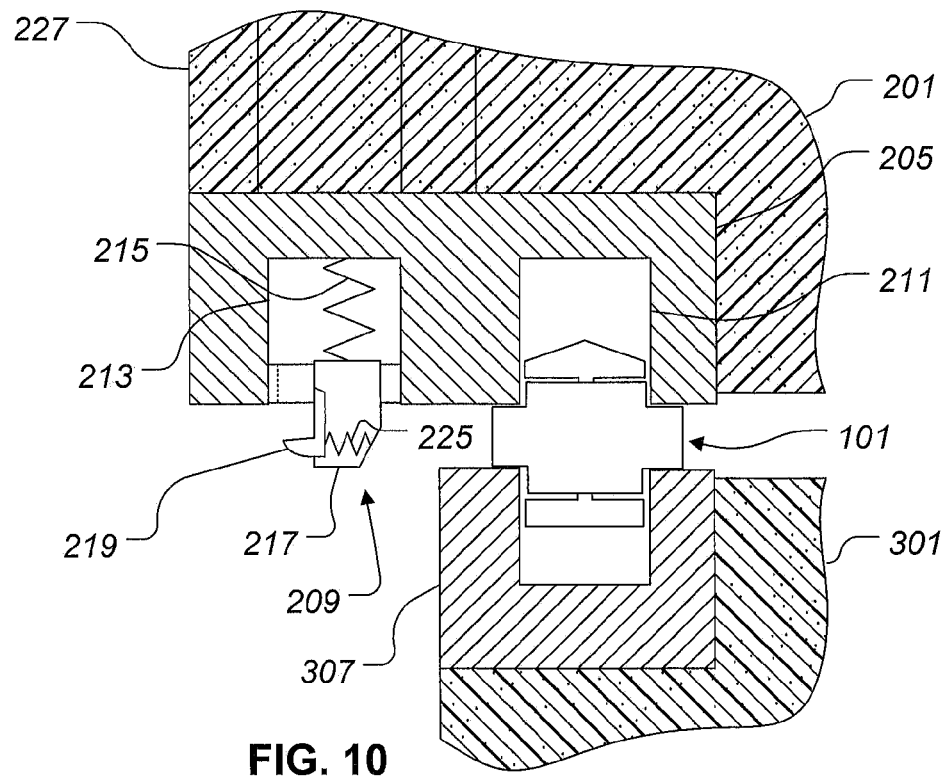
FIG. 10 is a stylized partial cross-sectional view of the container of FIG. 2 shown stacked onto an international sized container.

Container 201 preferably includes four lower castings 205. Each lower casting 205 has an inboard aperture 211 and an outboard aperture 213. CALS 203 includes a locking mechanism 209 within each outboard aperture 213 of lower casting 205. Inboard aperture 211 of each lower casting 205 is void in order to accommodate conventional locking mechanisms used to lock domestic container 201 on top of international container 301, as shown in FIG. 10. Locking mechanism 209 is integral with each lower casting 205 such that locking mechanism 209 remains as part of casting 205 during operation. However, it is preferred that locking mechanism may be removable from casting 209 for maintenance, inspection, and the like. Furthermore, conventional castings may be retrofitted with CALS 203, which is described further herein regarding FIG. 11. Locking mechanism 209 is schematically shown in FIGS. 5 and 6. Locking mechanism 209 is configured to recess, when container 201 is lowered onto a platform surface 901 without a receiving aperture configured to receive locking mechanism 209, as shown in FIG. 8. A device 215, which is schematically shown in FIGS. 5 and 6, allows a plunger 217 and a beak 219 to recess within casting 205. Device 215 is preferably a spring member capable of compressing, but device 215 may be any mechanism which resistibly allows plunger 217 to recess into casting 205 due to the compressive force from container 201 being lowered onto platform surface 901. For example, device 215 may be elastomer material configured to deform and provide the necessary spring force. Plunger 217 is operably associated with device 215. Plunger 217 preferably includes a durable metal capable of withstanding bearing forces that may occur during transport of container 201. Beak 219 is configured to selectively keep locking mechanism 209 attached to a mating aperture.

Although CALS 203 is shown in terms of plunger 217, device 215, and beak 219; it should be appreciated that a wide variety of mechanisms and members may be used to perform the desired functionality. For example, one embodiment may include a twist lock mechanism to selectively lock and recess. For example, the twist lock mechanism may twist to a locking point when container 201 is lowered onto receiving apertures. Further, the twist lock mechanism may selectively unlock container 201 from receiving apertures when container is lifted with the appropriate lifting force.

Figure 7:
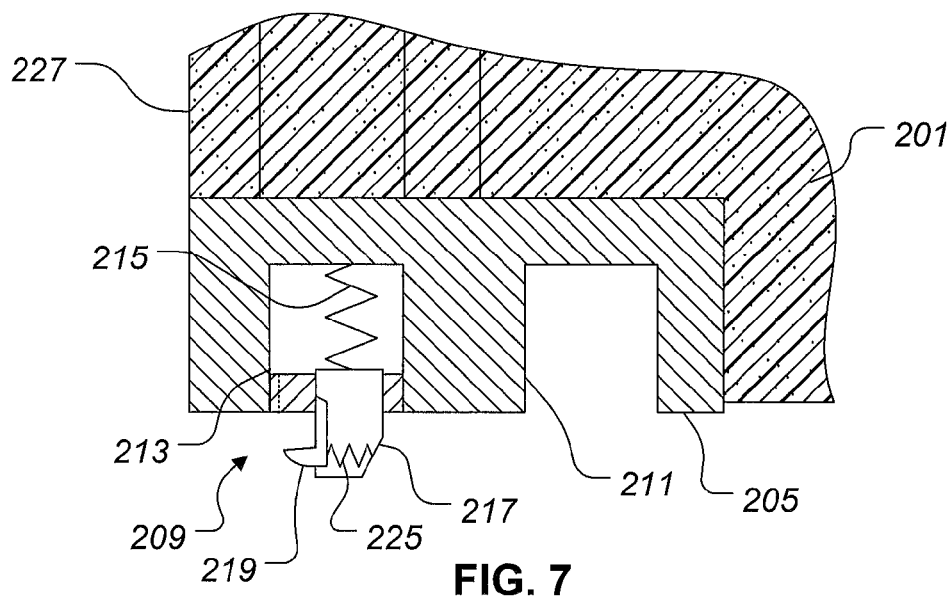
FIG. 7 is a stylized partial cross-sectional view of the container of FIG. 2, according the preferred embodiment of the present application.

Referring now to FIGS. 7 and 8, an embodiment of locking mechanism 209 is shown in further detail. FIG. 7 illustrates locking mechanism 209 in an extended position, which automatically occurs due to a spring force exerted by spring device 215. FIG. 8 illustrates locking mechanism 209 in a compressed position, which occurs when container 201 is placed upon platform surface 901. Platform surface 901 may be any surface not having an aperture capable of receiving locking mechanism 209. For example, platform surface 901 may be a ground surface, a railcar, a trailer, a container, a deck of a ship, to name a few. Even though locking mechanism 209 is shown entirely within lower casting 205, it should be appreciated that locking mechanism may be partially located with hollow portions of side post 227. As such, lower casting 205 may include openings to allow for functionality of locking mechanism 209.

Figure 9:
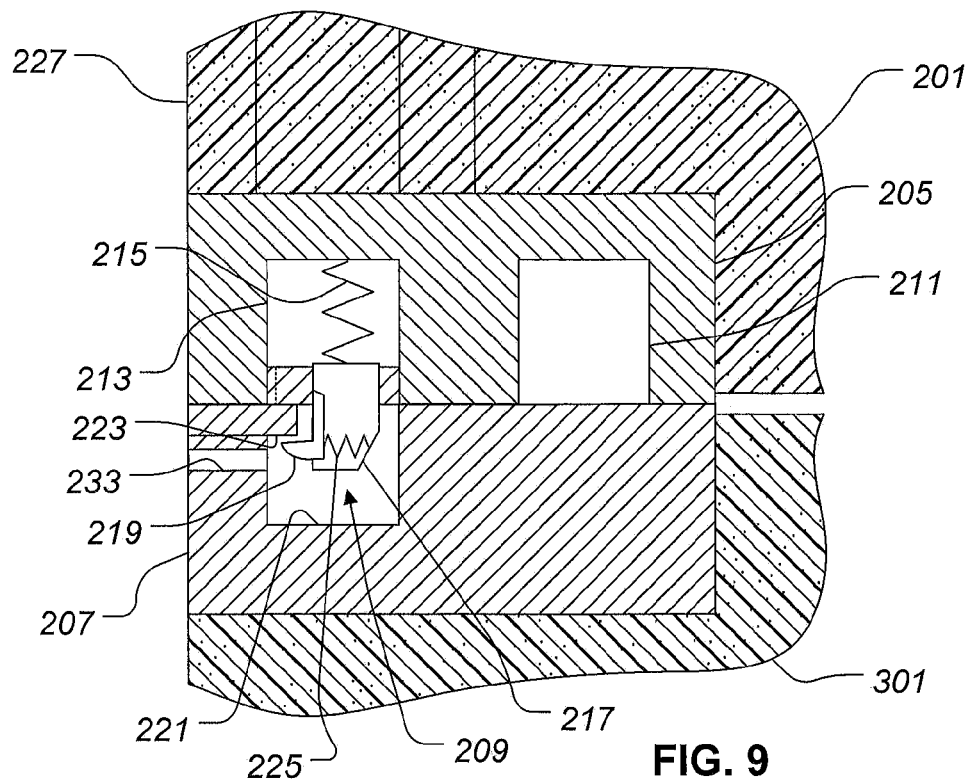
FIG. 9 is a stylized partial cross-sectional view of two containers stacked on top of each other.

Referring now to FIG. 9, container 201 is illustrated in a stacked position with locking mechanism 209 attached to a mating aperture. In FIG. 9, the mating aperture is an upper casting 207 on a lower container 201. It should be appreciated that a mating aperture similar to upper aperture 221 may exist on other transportation objects, such on a railcar, a trailer, a deck of a ship, to name a few. For example, upper aperture 221 may be integrated into a railcar. When container 201 is placed on top of container 201, beak 219 allows plunger 217 to enter upper aperture 221 past an aperture lip 223. Further, spring device 215 provides more resistance than beak 219 requires in overcoming aperture lip 223. During removal of upper container 201 from lower container 201, a lifting mechanism is used to lift upper container 201 vertically off of lower container 201. In the preferred embodiment, locking mechanism 209 is configured so as to require approximately 1200 lbs of lifting force for beak 219 to release and overcome aperture lip 223. Beak 219 is preferably configured with a spring 225 to provide the resistance necessary for locking mechanism 209 to release when container 201 is subjected to the necessary lifting force. Beak 219 and spring 225 are configured to prevent locking mechanism 209 from releasing prematurely. It should be appreciated that the resistance provided by beak 219 and spring 225 may be specifically tailored to provide more or less resistance, depending on the scenario. For example, if it is determined that container 201 needs to be able to withstand a higher aerodynamic load, then beak 219 and spring 225 may be tailored to release at a higher force threshold. A sight opening 233 in upper casting 305 allows an inspector to make visual contact with beak 219 in order to confirm that beak 219 is securely in the locked position. Beak 219 is preferably of a distinguishably color or finish so facilitate the inspector making visual contact with beak 219 through sight opening 233.

It should be appreciated that locking mechanism 209 may include other features, such as bearing type devices to keep plunger 217 from binding as it moves in and out of aperture 213. Locking mechanism 209 may also include one or more sensors to communicate to an operator whether each locking mechanism 209 is in an unlocked position or locked position. In addition, locking mechanism 209 may include a stop device which prevents plunger 217 from being pulled against spring 215 when container 201 is lifted off from a mating aperture.

Referring now to FIG. 10, container 201 is shown stacked upon international container 301. Due to the size differential between container 201 and container 301, an upper casting 307 of container 301 aligns with inboard aperture 211 of container 201. As such, locking mechanism 209 in outboard aperture 213 allows for container 201 to be locked to container 301 via a conventional IBC 101 installed in the inboard aperture 211, as shown in FIG. 10.

Figure 11:
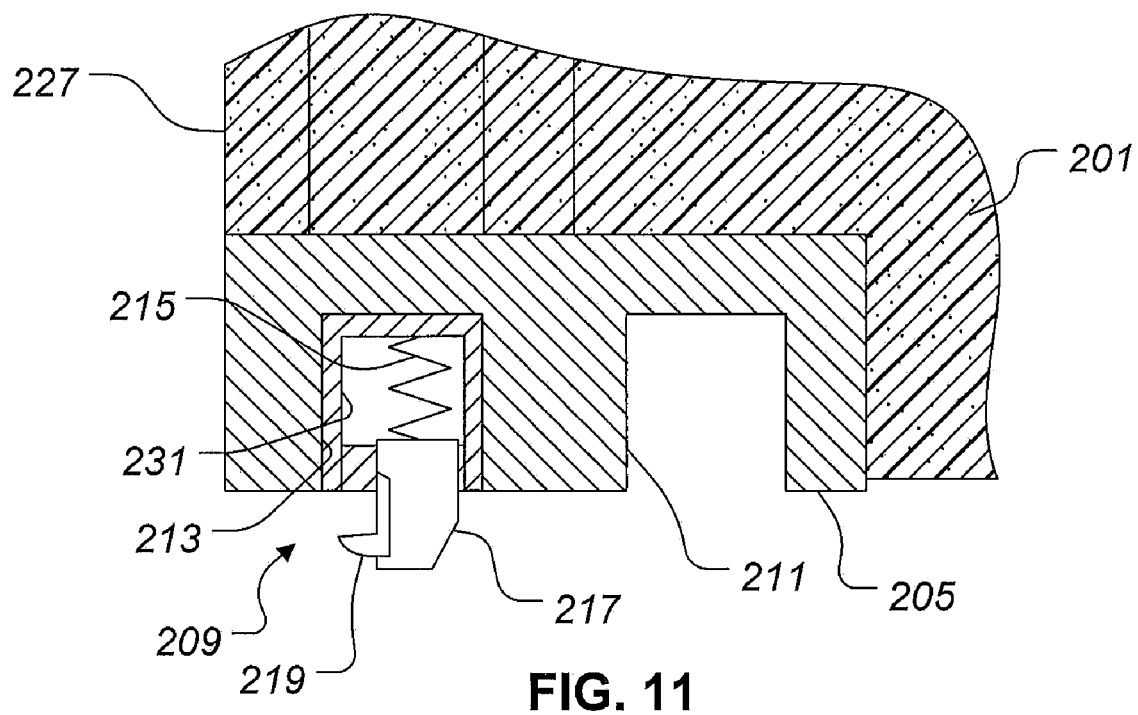
FIG. 11 is a stylized partial cross-section view of the container of FIG. 2, according the preferred embodiment of the present application.

Referring to FIG. 11, CALS 203 is shown as preferably being retrofitable into existing lower casting of convention domestic sized containers. In the embodiment shown in FIG. 11, locking mechanism 209 is positioned within a retrofit member 231. The retrofit member 231 is sized to be attached inside outboard aperture 213 in order to retrofit conventional lower castings 205 to form a container 201 having CALS 203. Retrofit member 231 may be attached to lower casting 205 with removable fasteners, or the like. Retrofit member 231 may also be permanently attached to lower casting 205 in a welding procedure, or the like.

CALS 203 provides significant cost and time savings during container loading and unloading procedures. For example, conventional domestic containers were stacked on top of each other with an IBC 101 in each corner. A typically loading procedure would include a lifting mechanism lifting a lower container onto a railcar. Next, the lifting mechanism would have to wait for a worker to climb a ladder onto the railcar and walk on a platform to install an IBC 101 in each stacking casting of the lower container. This is often a dangerous and time consuming task. The lifting mechanism would then lower an upper container onto the lower container, thereby sandwiching each IBC 101. The worker would then return to the platform and manually lock each IBC 101. A conventional unloading procedure is approximately opposite from the loading procedure.

CALS 203 provides a method of loading a railcar which is safer and more efficient. According the preferred method, a lower container 201 having CALS 203 is lowered onto a railcar via a lifting mechanism. Next, an upper container 201 is lowered onto lower container 201. CALS 203 allows for upper container 201 to automatically lock into lower container 201, as shown in FIG. 9. Because the locking is automatic, a worker does not having to manually lock the two containers together. Moreover, the lifting mechanism does not have to wait for a worker to install any IBC's.

Conversely, CALS 203 provides a method of unloading containers 201 from a railcar. According to the preferred method, upper container 201 is simply hoisted off from lower container 201 via the lifting mechanism. Because locking mechanism 209 is configured to release at a force applied by the lifting mechanism, the release of upper container 201 from a lower container 201 is automatic. As such, manual unlocking is not required. The lifting mechanism can then remove lower container 201 without having to wait for a worker to remove and stow any IBC's.

CALS 203 provides a method storing multiple containers 201 on top of each other. Typically, unloading containers 201 from multiple railcars takes place in a facility configured to efficiently unload the containers from the railcar, and store the containers until each containers can be loaded onto a tractor-trailer, or other means of transportation. A typical facility of this sort has limited space, as such; it is beneficial if a plurality of containers can be stacked on top of each other. GALS 203, according the present application, provides a method for stacking multiple containers 201 at an unloading facility. The method includes a first container 201 being unloaded from a railcar and onto a ground-like surface, such as platform surface 901 (shown in FIG. 8). As first container 901 is placed upon surface 901, each locking mechanism 209 automatically recesses so as to be compatible with surface 901. Secondly, a second container 201 is unloaded from the railcar and placed on top of first container 201. In doing so, each locking mechanism 209 of second container 201 automatically locks into each upper aperture 221 of first container 201. Thirdly, a third container 201 is unloaded from the railcar and placed on top of second container 201. In doing so, each locking mechanism 209 of third container 201 automatically locks into each upper aperture 221 of second container 201. The process continues until a desired number of containers 201 are locked together. For example, ten containers 201 may be stacked on top of each other. Such heights would make the use of IBC's to lock and store conventional containers very unpractical.

Further, CALS 203 is configured to require less overall height as compared to a conventional system using IBC's 101. For example, a conventional IBC 101 requires gap 111, as shown in FIG. 1. In contrast, CALS 203 includes locking mechanism 209 that does not require such a gap. As such, this space may be utilized by increasing the overall height of container 201, thereby increasing the space within container 201. Further, the space may simply be utilized to decrease the overall height of stacked containers, thereby decreasing the aerodynamic loading during transport, while also improving the clearance between the upper container and overhead obstacles, such as bridges. Even further, the absence of the gap may be utilized in partially increasing the height of each lower casting 205.

It is apparent that a system with significant advantages has been described and illustrated, including: 1) providing a container auto-lock system which automatically locks vertically stacked domestic sized containers; 2) providing a container auto-lock system which allows a domestic sized container to be stacked on top of an international sized container and locked via a conventional IBC; 3) providing a container auto-lock system which can recess so as to be stacked on top of a platform lacking a receiving aperture; 4) providing a container auto-lock system which is integral and travels with the container; and 5) providing a method of loading and unloading containers that is much more efficient and safer than conventional methods.

The particular embodiments disclosed above are illustrative only, as the system may be modified and practiced in different but equivalent manners apparent to those skilled in the art having the benefit of the teachings herein. The particular embodiments disclosed herein may be altered or modified, and all such variations are considered within the scope and spirit of the present application. Although the system of the present application is shown in a limited number of forms, it is not limited to just these forms, but is amenable to various changes and modifications without departing from the spirit thereof.

I claim:

1. A container auto-lock system for a container, the system comprising:
    a locking mechanism located in a lower casting of the container, the locking mechanism comprising:
        a plunger coupled to a device within the lower casting, the device configured to compress so as to allow the plunger to recess when the container is stacked upon a platform surface lacking a receiving aperture for the plunger;
        a beak configured to releasably latch to an aperture lip of an upper aperture;
        wherein the device provides a compressive force sufficient to force the plunger at least partially into the upper aperture; and
        wherein the beak is configured to release from the aperture lip when the container is subjected to a selected lifting force.

2. The container auto-lock system according to claim 1, wherein the upper aperture is part of an upper casting of a second container.

3. The container auto-lock system according to claim 1, wherein the selected lifting force is approximately 1200 pounds.

4. The container auto-lock system according to claim 1, wherein the container is approximately 53 feet long and 102 inches wide.

5. The container auto-lock system according to claim 1, wherein the locking mechanism is located in an outboard aperture of the lower casting.

6. The container auto-lock system according to claim 1, wherein the lower casting has an outboard aperture and an inboard aperture.

7. The container auto-lock system according to claim 1, wherein the upper aperture is part of trailer.

8. The container auto-lock system according to claim 1, wherein the platform surface is a ground surface.

9. The container auto-lock system according to claim 1, wherein the platform surface is a deck of a ship.

* * * * *